Patented June 22, 1943

2,322,572

UNITED STATES PATENT OFFICE 2,322,572

PRODUCTION OF AROMATIC AMINES

Harry L. Fisher, Stamford, Conn., assignor to U. S. Industrial Alcohol Co., New York, N. Y., a corporation of West Virginia No Drawing. Application August 3, 1940, Serial No. 351,143

6 Claims. (Cl. 260—577)

This invention relates to a new process for the production of methyl-substituted primary and secondary alicyclic and aromatic amines. The invention permits the production of these compounds in high yields from inexpensive starting materials. The invention is particularly advantageous for the production of p-toluidine.

In accordance with the present invention, methyl-substituted primary and secondary aromatic and alicyclic amines are produced by the catalytic hydrogenolysis of a compound or compounds containing the linkage

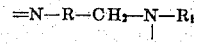

in which R and $R_1$ represent arylene and aryl radicals, substituted or unsubstituted, R being phenylene, nitrophenylene, sulfophenylene, methylphenylene, chlorophenylene, etc., and $R_1$ being phenyl, nitrophenyl, sulfophenyl, methylphenyl, chlorophenyl,

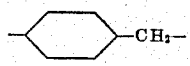

etc., and in which R and $R_1$ may be alike or different. The compound may be a more or less well defined compound, such as N-p-aminobenzylaniline, N-p-aminobenzylsulfanilic acid or N-p-aminobenzyltoluidine, or may be a polymeric compound such as the polymer formed by the action of formaldehyde on a primary or secondary aromatic amine in the presence of a strong mineral acid, such as polymeric anhydro-p-amino-benzyl alcohol. The reaction is general, and applicable to compounds containing the above linkage generally. In the hydrogenolysis, the linkage between the methylene group and the nitrogen is split, with formation of the corresponding methyl compound and the corresponding primary or secondary amine.

If the process is carried out under conditions such that the only addition of hydrogen is at the —CH₂—N= linkage, with splitting of this linkage and formation of separate aromatic compounds with the radicals —CH₃ and NH=, the process is a simple hydrogenolysis, and will be so designated herein. If the process is carried out under conditions such that hydrogen is added not only at the —CH₂—N= linkage, but also at other portions of the molecule, e. g., with the production of alicyclic compounds by addition of hydrogen to an aromatic ring structure or the production of methyl substituted diamines by reduction of compounds having a nitro group attached to an aromatic ring structure, the process is a combined hydrogenolysis and hydrogenation.

The invention is of particular importance as applied to compounds in which the methylene group and the amino group attached to the same nucleus are in the para position with respect to each other, as in such case the hydrogenolysis results in the production of a p-methylaminobenzene derivative. If the methylene group and the amino group are in the ortho position, the hydrogenolysis would produce the corresponding o-aminomethylbenzene derivative.

The hydrogenolysis should be carried out with the use of a catalyst and operating conditions of a nature such as to promote the addition of hydrogen at the bond between the amino nitrogen and the methylene group, to cause the addition of an atom of hydrogen to the methylene group and an atom of hydrogen to the amino group, with splitting or rupture of the bond between the two. Unless compounds otherwise hydrogenated are desired, the conditions should not be such as to favor reduction of other portions of the molecule or the addition of hydrogen to other parts of the molecule. While the present invention includes the carrying out of the reaction in such a way as to produce hydrogenated derivatives of methyl primary and secondary aromatic amines, such as hexahydrotoluidine, etc., it is usually advantageous to carry out the reaction in such a way as to cause the addition of hydrogen only at the methylene group and the amine group at which splitting takes place, and if further reduction of the product so produced is desired, to carry this further reduction out as a separate step, catalytically, electrolytically, by the Clemmensen process or in other ways.

A number of catalysts may be used in carrying out the new process. Nickel gives excellent results at temperatures ranging from 75° C. or somewhat less to 250° C. or somewhat more and pressures ranging from 100 to 5000 pounds per square inch. Of course, at lower temperatures and pressures, the reaction is somewhat slower than at higher temperatures and higher pressures. At the higher temperatures, such as 200° C., using a nickel catalyst, hydrogenation beyond hydrogenolysis tends to take place, and may result in the addition of hydrogen to the ring of the aromatic nucleus. While this is not undesirable if an alicyclic compound is being produced, it is undesirable if an aromatic compound is being produced, and accordingly, with a catalyst such as Raney nickel, the temperature should be kept in the neighborhood of 100-150° C. Other forms of nickel catalysts such as nickel supported on kieselguhr may be used. Another catalyst, copper chromium oxide, may also be used, and although a higher temperature may be required for the hydrogenolysis less hydrogenation of the aromatic nucleus occurs than when these higher temperatures are used with nickel catalysts.

There are important advantages in carrying out the hydrogenolysis in a medium which is approximately neutral, particularly where polymeric anhydroaminobenzyl alcohol or its homologues are subjected to the hydrogenolysis, as the use of an approximately neutral medium gives greatly increased yields. With many of the intermediates, such as the polymeric anhydroaminobenzyl alcohol, rearrangement of the polymer may take place in the presence of strong acids, and such rearrangement may result, in the hydrogenolysis, in the production of other than the desired product, or in a drastic increase in the amount of impurities, etc., in the final product. By "approximately neutral medium" I mean a medium which has a pH, as measured by a glass electrode, ranging from about 5 to about 9, as distinguished from strongly acid media of lower pH and strongly basic media of higher pH.

The intermediate products which are subjected to hydrogenolysis in accordance with the present invention are advantageously prepared by suitable reaction of formaldehyde with aromatic amines, with the production of condensation products characterized by having at least two aromatic nuclei linked by a $$-CH_2-N-$$
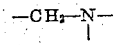

linkage. In some cases, this condensation product will be a polymeric product, the exact structure of which is not known, but which, in accordance with the present information now available in the art, contains a more or less large number of aromatic, e. g. benzene, nuclei linked by the $$-CH_2-N-$$
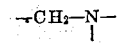

linkage. In other cases, the condensation product may be a more or less well defined compound, also characterized by having at least two aromatic nuclei linked by the $$-CH_2-N-$$
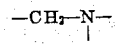

linkage.

The following equations illustrate the production of methyl derivatives of aromatic and alicyclic amines in accordance with the present invention, starting with an aromatic amine and formaldehyde; and while I believe that the equations and formulae set forth are correct, I do not wish to be bound by them as in many instances it is impossible to determine the exact structure of the intermediate polymeric compound.

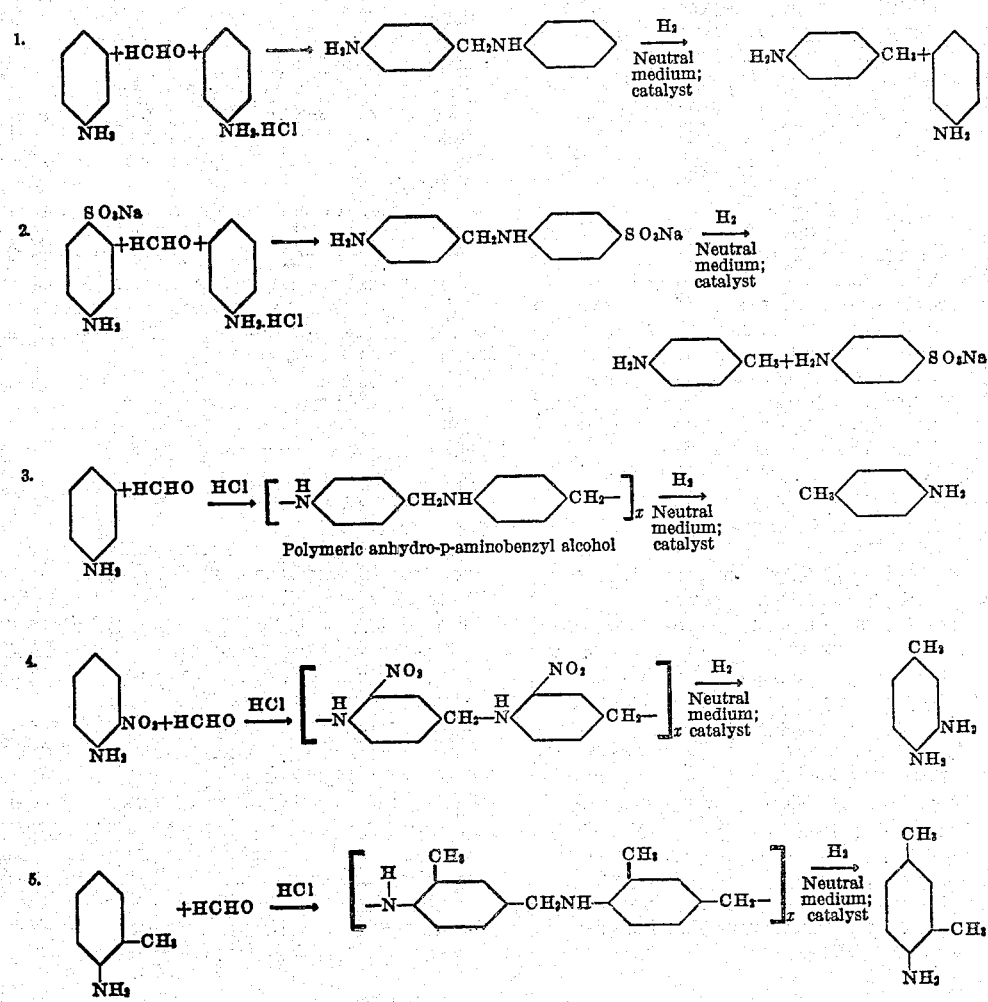

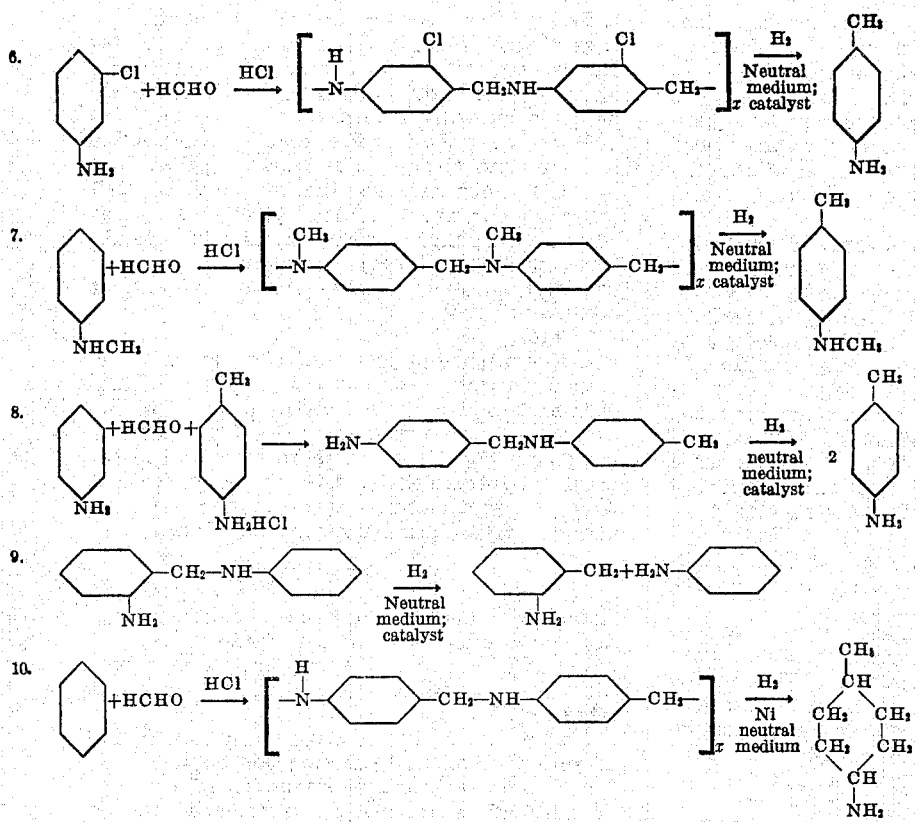

The present invention is particularly important for the production of para methyl aniline derivatives, such as p-toluidine, as it permits the introduction of the methyl group by means of formaldehyde in the para position with respect to the amine group with high yields, as compared with processes now available which usually give relatively poor yields of the para compound. For example, p-toluidine is widely used for the manufacture of dyestuffs, pharmaceuticals, rubber chemicals, etc., whereas o-toluidine does not have a large market. Nevertheless, in the processes commonly used for the preparation of p-toluidine, which involve the nitration of toluene and the reduction of the nitro derivative produced, a larger proportion of the ortho compound is formed than of the para compound, and the ortho compound produced is more or less of a waste product, at least in comparison with the p-toluidine. In contrast with this, p-toluidine is produced from aniline in accordance with the present invention, in much higher yields.

The invention will be illustrated by the following specific examples, but it is not limited thereto.

*Example 1.*—93 parts of aniline are dissolved in 205 parts of water and 111 parts of concentrated hydrochloric acid. The solution is cooled and 81 parts of 37% formaldehyde solution are added. A whitish precipitate first forms. This changes to an orange colored precipitate which is the hydrochloride of polymeric anhydro-p-aminobenzyl alcohol. A slight excess of the equivalent amount of alkali to neutralize the hydrochloric acid is added with cooling, the insoluble polymeric base is filtered off and thoroughly washed with water. The cake, containing about 50% water, is mixed with an equal amount of 95% ethyl alcohol, the suspension is transferred to a hydrogenation apparatus and 10 parts of wet nickel catalyst are added. The mixture is well stirred and heated with hydrogen at a temperature of 125° C. and a pressure of 500 pounds per square inch. After the reaction is complete, as shown by the fact that hydrogen is no longer absorbed, the apparatus is allowed to cool to room temperature, the liquid mixture is filtered to remove the catalyst and any other insoluble products, the filtrate is acidified, e. g. with hydrochloric acid to form the hydrochloride of the p-toluidine, the alcohol is removed by distillation, the residue is treated with caustic soda or other alkali to set free the p-toluidine, and the product is then steam-distilled. The crude p-toluidine obtained in the distillation crystallizes at room temperature and is obtained in a yield of 80 to 90% of theoretical.

*Example 2.*—The same amounts of aniline and formaldehyde are reacted to form the polymer as described in Example 1, and the polymer is then hydrogenolyzed to give p-toluidine in the presence of 5 parts of copper chromium oxide promoted with barium oxide, at a temperature of 250° C. and a pressure of 3000 pounds per square inch.

*Example 3.*—Sodium sulfanilate, formaldehyde and aniline hydrochloride are reacted to form N-p-aminobenzylsulfanilic acid in the known way. This product is neutralized with caustic soda to form the sodium salt, which is then subjected to hydrogenolysis using a nickel catalyst at a temperature of 125° C. and a pressure of 2000 pounds per square inch. The hydrogenolysis results in the production of p-toluidine and sodium sulfanilate, which are separated by steam distillation, the p-toluidine going over with the steam. The sodium sulfanilate remains in the distilland, and can be used again in the process.

*Example 4.*—p-Aminobenzylaniline was prepared by adding a solution of formaldehyde to several times the equivalent amount of aniline; after standing two days the water layer was removed and the lower layer cooled and treated with dry powdered aliline hydrochloride with stirring. The mixture was neutralized and distilled with steam. The p-aminobenzylaniline, which separated as an insoluble layer in the distilland, was hydrogenolyzed at a temperature of 125° C. and a pressure of 2000 pounds per square inch. The products were isolated as the acetyl derivatives and were found to consist of approximately equal quantities of acetanilide and p-acetotoluide.

Example 5.—o-Toluidine is condendensed with formaldehyde in the presence of hydrochloric acid with the formation of polymeric anhydro-4-amino-3-methylbenzyl alcohol, which is neutralized and then hydrogenolyzed by the procedure of Example 1 with production of 4-amino-1,3-xylene. A certain amount of side reaction takes place with production of various other products.

Example 6.—m-Chloroaniline is condensed with formaldehyde in the presence of hydrochloric acid, and then neutralized with subsequent hydrogenolysis of the polymeric compound produced, with formation of p-toluidine. In this reaction the methyl group appears in the position para to the amino group, and the chlorine is replaced by hydrogen.

Example 7.—Equimolecular portions of N-methyl-aniline and formaldehyde are condensed in the presence of hydrochloric acid, and the polymeric compound obtained is neutralized and then hydrogenolyzed by the procedure in Example 1 with the production of N-methyl-p-toluidine. In one case, the product was identified by the melting point of its acetyl derivative, 77–81° C. The acetyl derivative of a known specimen melted 76–78° C., and the melting point of the mixture was 77–81° C.

As previously pointed out, the carrying out of the reaction in a substantially neutral medium, i. e., a medium which, when carrying the amine-formaldehyde reaction product has a pH ranging from about 5 to 9, has important advantages. Various media may be used, including water, aqueous alcohol, organic solvents, etc., and the material to be subjected to hydrogenolysis may be either suspended or dissolved in the medium. With many of the intermediates, it is relatively simple to adjust the pH to a proper value, as by washing. Other intermediates may normally have, in the medium selected, the proper value; while others may require neutralization with ammonia, caustic soda or other basic material. For example, in the production of p-toluidine from aniline and formaldehyde, an intermediate product may be the polymeric anhydro-p-aminobenzyl alcohol, produced by condensing aniline and formaldehyde in the presence of a strong mineral acid. The initial condensation product is strongly acid. If, in the preparation of it, thorough stirring is used, with the production of the hydrochloride of the polymer in finely divided form, the product may, by several washings, be substantially freed from the acid and may be subjected to hydrogenolysis, for example, in suspension in aqueous alcohol, with the production of toluidine in high yields. On the other hand, if the product is not produced in finely divided form, washing may not remove sufficient of the acid, which tends to be occluded, and it may be necessary to add some ammonia, caustic soda, sodium carbonate, or the like, to raise the pH of the aqueous alcoholic suspension to approximate neutrality to permit obtaining the p-toluidine in high yields. If an excess of the alkaline material is used, so that the pH of the suspension or solution is unduly raised, the rate of the reaction is markedly decreased.

Since the polymers are practically insoluble in water and alcohol, it is important that during the hydrogenolysis the mixtures be well stirred. Ordinary stirring gives low yields whereas turbulent stirring gives high yields. The reaction can be carried out in the presence of water, alcohol, or other suitable solvent, or mixtures thereof.

I claim:

1. The method of producing compounds of the class consisting of aromatic and alicyclic amines with at least one methyl group attached to the cyclic structure which comprises subjecting a compound capable of being formed by the reaction of formaldehyde with an amine selected from the group consisting of primary and N-alkyl phenyl amines and having the radical

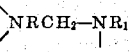

in which R and $R_1$ are benzene nuclei to hydrogenolysis by the action of hydrogen in the presence of a hydrogenation catalyst in a medium maintained at a pH ranging from about 5 to about 9.

2. The process as in claim 1, in which the catalyst is a nickel hydrogenation catalyst.

3. The process for the production of aromatic amines with a methyl group attached to the aromatic nucleus which comprises subjecting a compound capable of being formed by the reaction of formaldehyde with an amine selected from the group consisting of primary and N-alkyl phenyl amines and containing the radical

in which R and $R_1$ are benzene nuclei to hydrogenolysis by the action of hydrogen in the presence of a hydrogenation catalyst in a medium maintained at a pH ranging from about 5 to about 9.

4. The process for the production of p-toluidine which comprises subjecting a compound capable of being formed by the reaction of formaldehyde with an amine selected from the group consisting of primary and N-alkyl phenyl amines and having the linkage

in which R is a benzene nucleus to hydrogenolysis by the action of hydrogen in the presence of a hydrogenation catalyst in a medium maintained at a pH ranging from about 5 to about 9.

5. The process for the production of p-toluidine which comprises subjecting N-p-aminobenzylaniline to hydrogenolysis by the action of hydrogen in the presence of a hydrogenation catalyst in a medium maintained at a pH ranging from about 5 to about 9.

6. The process for the production of p-toluidine which comprises subjecting polymeric anhydro-p-aminobenzyl alcohol to hydrogenolysis by the action of hydrogen in the presence of a nickel hydrogenation catalyst in a medium maintained at a pH ranging from about 5 to about 9.

HARRY L. FISHER.

Certificate of Correction

Patent No. 2,322,572. June 22, 1943.

HARRY L. FISHER

It is hereby certified that errors appear in the printed specification of the above numbered patent requiring correction as follows: Page 3, first benzene ring in formula 10, for

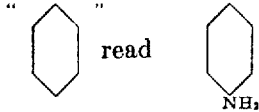

and second column, line 75, for "aliline" read *aniline*; page 4, first column, line 10, Example 5, for "condendensed" read *condensed*; and that the said Letters Patent should be read with these corrections therein that the same may conform to the record of the case in the Patent Office.

Signed and sealed this 3d day of August, A. D. 1943.

[SEAL]

HENRY VAN ARSDALE,
*Acting Commissioner of Patents.*